United States Patent [19]

Tomita et al.

[11] Patent Number: 4,630,251
[45] Date of Patent: Dec. 16, 1986

[54] VIDEO DISC REPRODUCING APPARATUS

[75] Inventors: Masao Tomita, Neyagawa; Akihiro Takeuchi, Ikoma; Akio Hashima, Kyoto, all of Japan

[73] Assignee: Matsushita Electric Industrial Co., Ltd., Kadoma, Japan

[21] Appl. No.: 472,473

[22] Filed: Mar. 7, 1983

[30] Foreign Application Priority Data

Mar. 12, 1982 [JP] Japan .................................. 57-39819
Mar. 15, 1982 [JP] Japan .................................. 57-41269

[51] Int. Cl.$^4$ ........................ G11B 9/07; G11B 21/02
[52] U.S. Cl. ................................... 369/43; 369/50; 369/126; 369/244
[58] Field of Search .................. 369/43, 50, 126, 128, 369/244, 251, 174, 175, 134; 358/907; 328/145; 307/492

[56] References Cited

U.S. PATENT DOCUMENTS 3,623,734 11/1971 Sakamoto ............................. 369/43
3,830,505 8/1974 Rabinow ............................. 369/224
4,317,052 2/1982 Morris ................................. 328/145
4,340,956 7/1982 Miller ................................. 369/244
4,492,930 1/1985 Knowles ............................. 328/145

FOREIGN PATENT DOCUMENTS 0035192 2/1981 European Pat. Off. .
2749617 5/1979 Fed. Rep. of Germany .
2073934 10/1981 United Kingdom .

OTHER PUBLICATIONS

Patent Abstracts of Japan, vol. 6, No. 30, Feb. 23, 1982 and JP-A-56-148703.

Primary Examiner—Alan Faber
Attorney, Agent, or Firm—Wenderoth, Lind & Ponack

[57] ABSTRACT

A video disc reproducing apparatus is provided with a pickup by which the information recorded on a video disc is detected as a variation in electrostatic capacity. The signal output from the pickup is processed so as to generate a control signal proportional to the logarithm of the pickup signal. This control signal is then utilized to control the pressure of the pickup on the video disc. Element functions of the apparatus may be combined such that an automatic gain control device may also serve to generate the logarithmic control signal.

3 Claims, 8 Drawing Figures

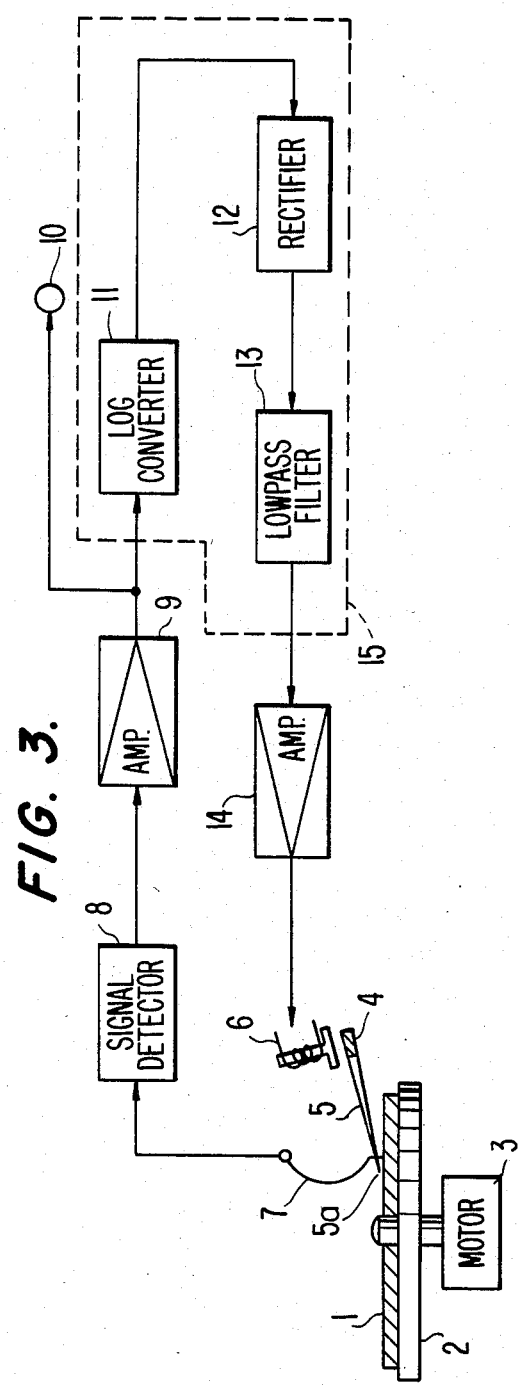
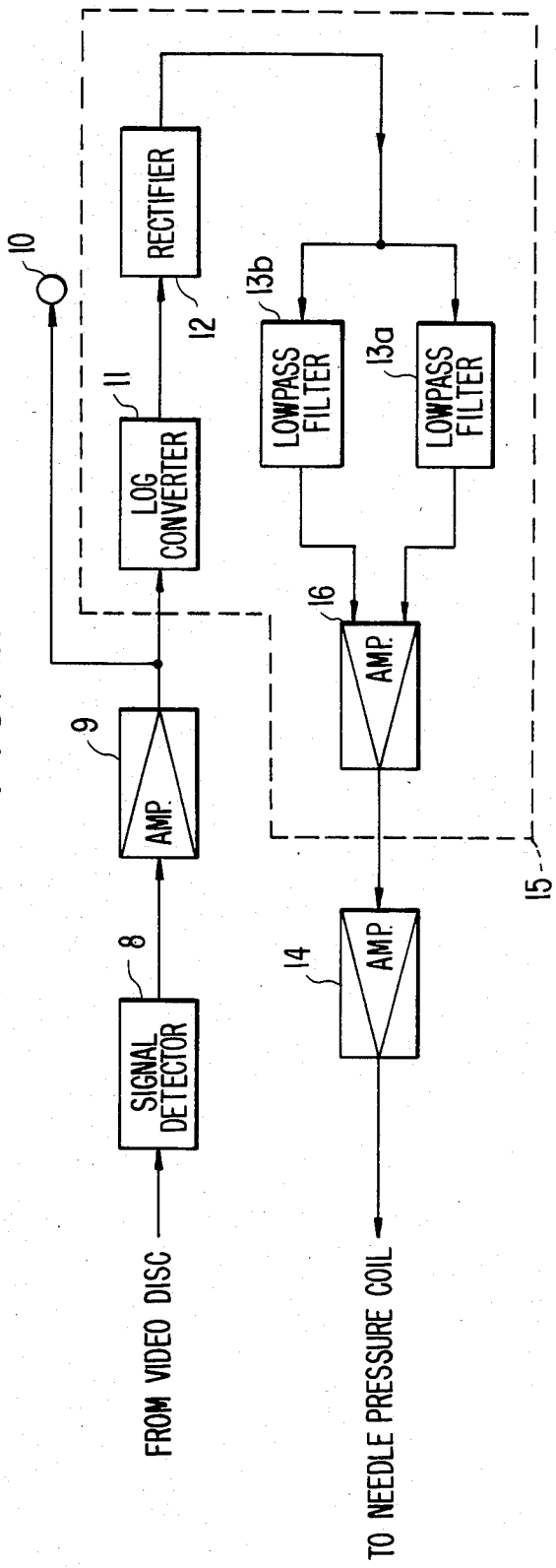

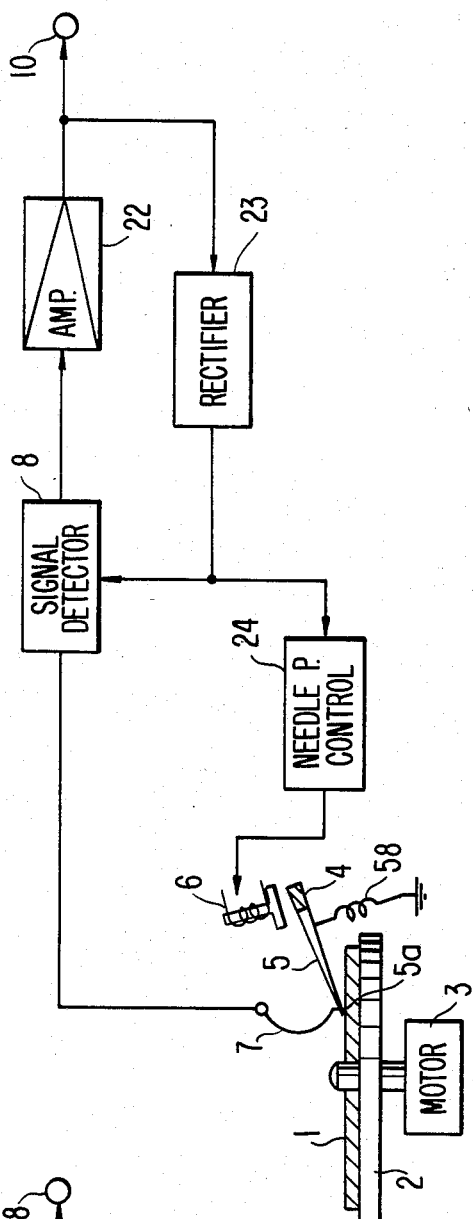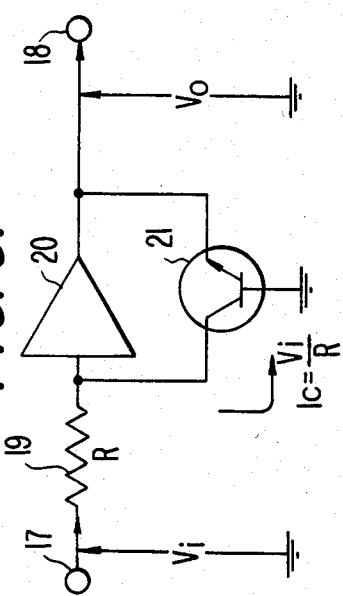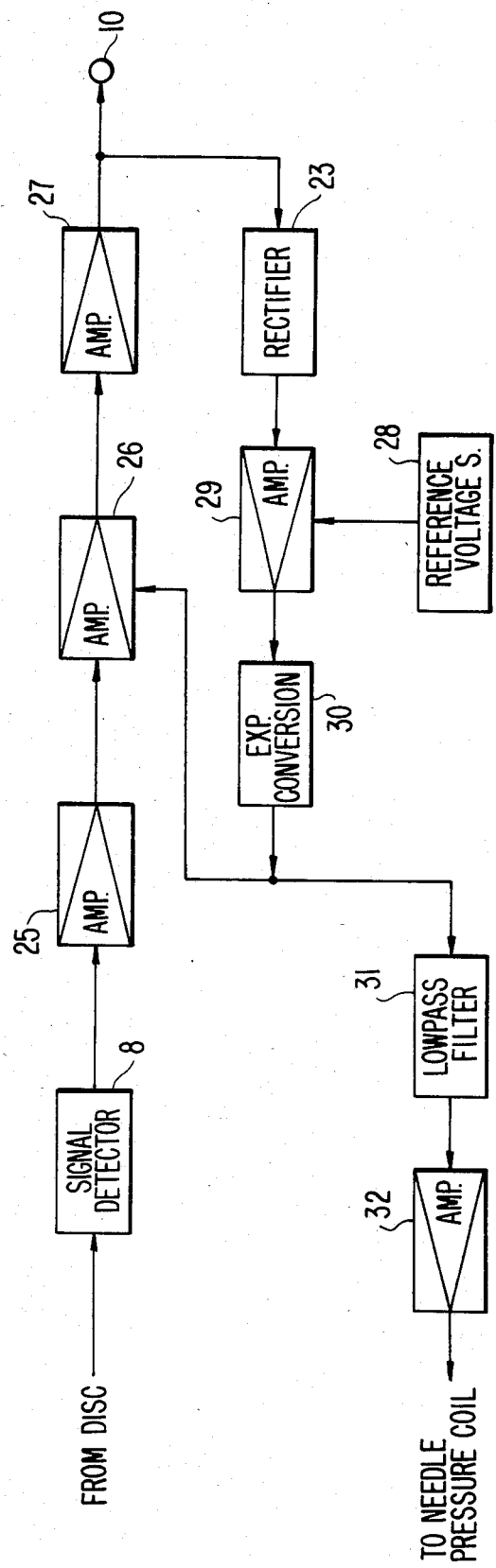

VIDEO DISC REPRODUCING APPARATUS

BACKGROUND OF THE INVENTION

1. Field of the Invention

This invention relates to a video disc reproducing apparatus provided with a pickup means by which the information recorded on a video disc is detected as a variation in electrostatic capacity.

2. Description of the Prior Art

Conventionally, the video disc reproducing apparatus of an electrostatic capacity detection system type rotates the video disc while contacting at the surface thereof with a pickup needle, whereby minute dust enters between the disc and the needle point. As a result, an output of reproduced signal picked up by the pickup needle point lowers, thereby creating a problem of a deteriorating signal-to-noise ratio. For preventing the deterioration of the reproduced signal caused by the sticking dust, it has been found that one effective remedy for the above is to increase pressure of the pickup needle when dust sticks to its point. Furthermore, it has been found from the recent research that the amplitude of reproduced output signal begins to lower when dust begins to stick to the needle point so that the amplitude greatly lowers as the dust accumulates, in which if the needle pressure slightly increases while dust accumulates still a little, the dust is easily removable and thereafter hard to accumulate. Also it is effective for removal of dust to control the pickup needle pressure corresponding to the amplitude of reproduced signal. However, the needle pressure, when controlled by control voltage proportional merely to the amplitude of reproduced signal, leads to a change also due to disparities in the amplitude of the reproduced signal. In other words, variations in the disc or pickup needle will cause the disparities in the reproduced signal, in which the needle pressure also will have changed. Next, explanation will be given on the above matter according to FIG. 1, in which the axis of abscissa represents the signal amplitude and the axis of ordinate the control voltage proportional thereto. Now, assuming that the signal amplitude is reproduced at 5 V and lowers by sticking dust so that the control voltage drops only by ΔV, it is meant that the signal amplitude at that time lowers by 20% from 5 V to 4 V. However, for example, in a case of using a poor disc to reproduce the signal amplitude at 2 V, the output signal in turn lowers by 50% from 2 V to 1 V. In brief, since a rate of change differs with respect to the constant value of control voltage, the signal is not usable for controlling the needle pressure.

SUMMARY OF THE INVENTION

An object of the invention is to provide a video disc reproducing apparatus having a pickup needle pressure control function capable of effectively preventing the signal-to-noise ratio from deterioration caused by sticking dust between the video disc and the pickup needle, without deteriorating the quality of the reproduced signal, such as a video, sound or tracking signal.

Another object of the invention is to provide a video disc reproducing apparatus which is capable of effectively controlling the needle pressure in spite of existence of disparities in the reproduced output signal when information thereof controls the needle pressure for the video disc.

Still another object of the invention is to provide a video disc reproducing apparatus which performs, on a basis of the same information, the needle pressure control and the automatic gain control (AGC) for controlling the reproduced output signal from the video disc to be constant.

These and other objects and features of the invention will become more apparent upon a reading of the following detailed description with the accompanying drawings in which:

BRIEF DESCRIPTION OF THE DRAWINGS

FIG. 3 is a principal structural view of an embodiment of a video disc reproducing apparatus of the invention, FIG. 4 is a block diagram of the principal portion of a modified embodiment of the invention, FIG. 5 is a circuit diagram of a structural example of a logarithmic converter used in this invention, FIG. 6 is a main structural view of the principle of the invention, FIG. 7 is a block diagram of the principal portion of another modified embodiment of the invention.

DESCRIPTION OF THE PREFERRED EMBODIMENTS

Figure 1:
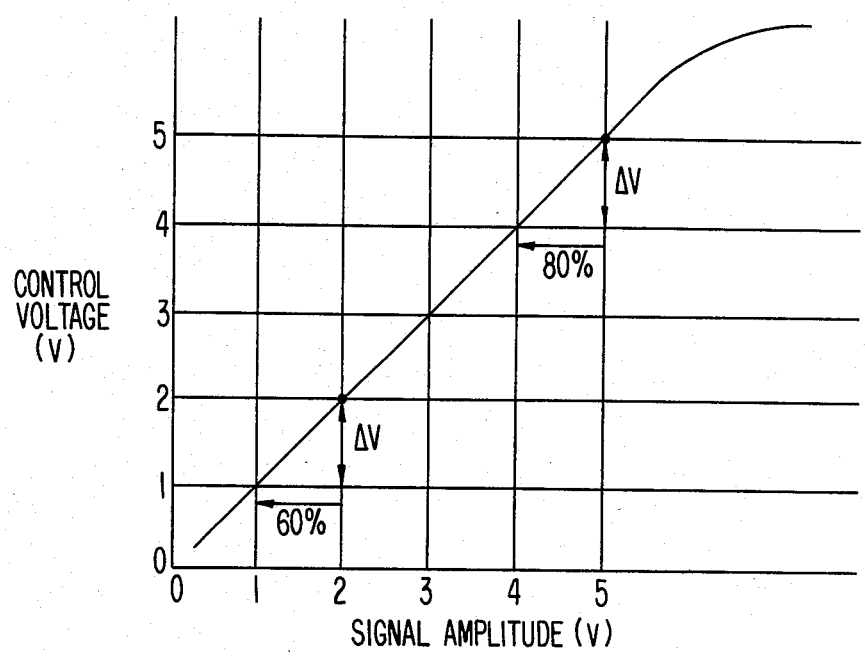
FIGS. 1 and 2 are graphs of characteristics of signal amplitude to control voltage, for explanation of the principle of the invention.
Figure 2:
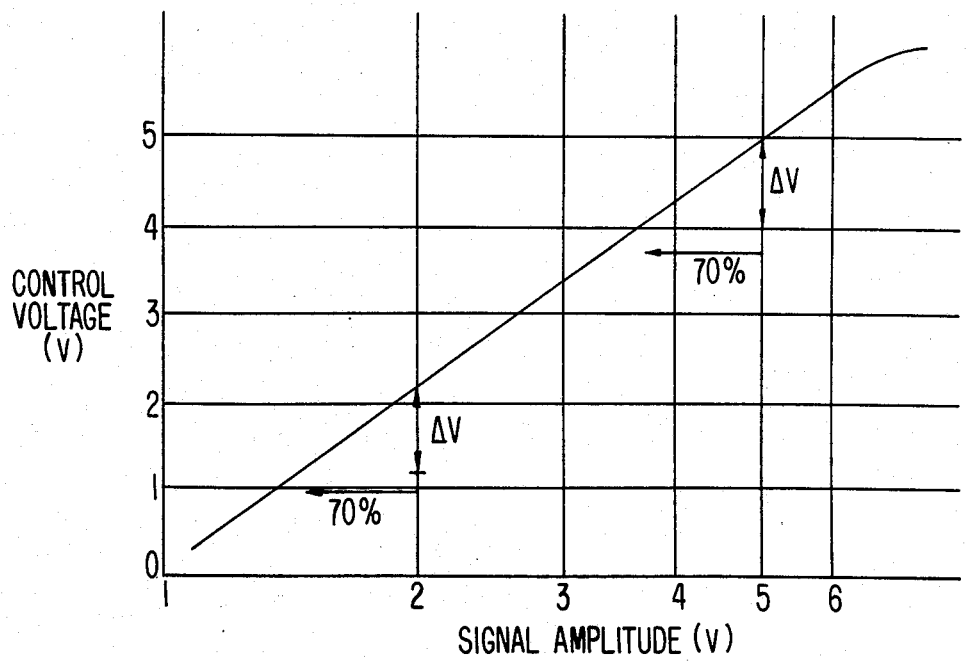

Referring to FIG. 2, the principle of this invention is shown and then an embodiment of the invention will be detailed in FIGS. 3 through 5. An example of characteristic of control voltage used in this invention is shown in FIG. 2, in which the axis of abscissa represents logarithmic scales and the axis of ordinate linear scales. In this case, a change of signal amplitude with respect to a change ΔV of control voltage, even in the vicinity of 5 V or 2 V of signal amplitude, is about 70% in the same rate of change. This means that when the control voltage is generated in proportion to a logarithm of signal amplitude, the rate of change of signal amplitude is constant with respect to a variation in control voltage. In a case of controlling the needle pressure for the video disc, such control voltage, when in use, can control the needle pressure corresponding to a percentage of lowering signal amplitude regardless of the output signal level, thereby obtaining a desired performance.

Referring to FIG. 3, a video disc 1 is placed on a turntable 2 rotatably driven by a motor 3. A change in electrostatic capacity by bits engraved as recorded information on the video disc 1 is picked up by a pickup needle 5a attached to the tip of a pickup means 5 and then guided to a signal detector 8 through a fly lead 7; the signal detector 8 converts the electrostatic capacity change into an electric signal and feeds the reproduced signal to a head amplifier 9; the pickup means 5 carries a magnet 4. An electromagnet 6 for controlling the needle pressure is disposed at a fixing portion in the vicinity of magnet 4, these magnets constituting a needle pressure control means. The electromagnet 6 is coiled and the magnet 4 is controlled in position corresponding to a current flowing in the coil so that the pressure of pickup needle 5a with respect to the video disc 1 is controlled. An output of head amplifier 9 is guided to a terminal 10 and fed to a signal processing circuit (not shown) and also given to a logarithmic converter 11 which constitutes together with a rectifier 12 and a low-pass filter 13, a control signal generating means to be discussed below; the logarithmic converter 11 serves to generate a signal proportional to the logarithm of amplitude of the output from head amplifier 9, i.e., the reproduced signal by the video disc 1. The logarithmically transformed signal is rectified by the rectifier 12 and smoothed by the low-pass filter 13 so as to be the control voltage, the low-pass filter 13 setting its time constant in a suitable value for the needle pressure control. The control voltage obtained from the low-pass filter 13 is given to the electromagnet 16 through a needle pressure coil driving amplifier 14. The needle pressure coil driving amplifier 14 alternatively may be included in the needle pressure control means.

Such construction, when dust sticks between the video disc 1 and the pickup needle 5a, can detect the lowering of reproduced signal and control the needle pressure to rise and operate to remove the sticking dust, resulting in that the reproduced signal of constant value is obtained from the terminal 10, in which the control signal is proportional to the logarithm of amplitude of reproduced signal, whereby an amount of needle pressure control with respect to a ratio of level-lowering of reproduced signal, even when the output signal changes due to disparities in the video disc 1 and pickup needle 5a, is the same as abovementioned.

FIG. 4 shows only the unit mainly generating the control signal voltage. The construction in FIG. 4 is different from that in FIG. 3 in that the control signal generating means 15, which feeds the output signal of rectifier 12 to first and second low-pass filters 13a and 13b, the outputs therefrom are given to a differential amplifier 16, and the output thereof is used as the signal for needle pressure control. In the FIG. 4 embodiment, the time constant is selected sufficiently larger for the first low-pass filter 13a and relatively smaller for the second low-pass filter 13b. In other words, since the output of first low-pass filter 13a is an average reproduced signal output and that of second low-pass filter 13b is an instantaneous reproduced signal output, this embodiment is so constituted that the instantaneous output, when lower than the average value, is detected of its value by the differential amplifier 16. Accordingly, when the output has the level lower than the average reproduced output level because of dust or the like sticked to the needle, a control voltage corresponding to the output of lower level is obtained, whereby this embodiment functions to increase the needle pressure, in which the logarithmic converter 11 effectively operates in the same way as in the FIG. 3 embodiment.

Referring to FIG. 5, the logarithmic converter 11 used in this invention is so constructed that the collector-emitter line of a transistor 21 of the grounded base is connected across an input terminal and an output terminal of an operational amplifier 20 so that the transistor 21 is used as a logarithmic transformation element. Here, when the signal amplitude given to the input terminal 17 is represented by Vi, a collector current Ic of transistor 21 is determined by Vi and a resistance value R of input resistance 19, so that $$Ic = \frac{Vi}{R}$$

is given.

Voltage $V_{BE}$ across the emitter and the collector at the transistor 21 is given generally by the following equation:

$$V_{BE} \approx \frac{kt}{q} \ln \frac{Ic}{Io}, \quad (1)$$

where
k: Boltzmann constant,
T: absolute temperature,
q: charge of an electron, and
Io: reverse-direction saturation current.

The signal amplitude Vo obtained at the output terminal 18 is equal to $V_{BE}$. Therefore, the following equation holds:

$$Vo \approx a \log Vi + b \quad (2),$$

where a and b are the constants. Hence, an output amplitude proportional to the logarithm of the input amplitude is obtained.

In addition, in the above embodiment, explanation has been given on the constitution of rectification after logarithmic transformation, but the same effect of course is obtainable by logarithmic transformation after rectification.

Next, explanation will be given on another modified embodiment in accordance with FIGS. 6 through 8.

As seen from the above, it is effective to control the pressure of the pickup needle of the electrostatic capacity detection system in such a manner that the needle pressure creates the predetermined variation when the reproduced signal level varies at a fixed percentage, and has no direct relationship with respect to the magnitude of the reproduced signal level caused by the disparities in the disc or pickup needle. For this purpose, the needle pressure need only be controlled by a control voltage proportional to the logarithm of input signal amplitude.

On the other hand, since a reproduced signal output of a level which is constant as possible is convenient for the subsequent signal processing system, it is desirable that an automatic gain control (AGC) generally controls the reproduced signal output so as to be constant. In this case, the problem will be created in that when the aforesaid needle pressure control and automatic gain control are performed independently, the circuitry becomes complex and the number of pins (of an IC chip) increases for the integration of system.

This embodiment is intended to solve the above problem, which is so constructed that the automatic gain control for the constant reproduced signal output from the video disc and the pickup needle pressure control, are controllable on a basis of the same information. Next, explanation will be given on the embodiment shown in FIGS. 6 through 8.

Referring to FIG. 6, a video disc 1 is placed on a turntable 2 rotatably driven by a motor 3 so that variation in electrostatic capacity by bits recorded (engraved) as the information on the video disc 1 is picked up by a pickup needle 5a at the tip of pickup means 5 and guided to a signal detector 8, through a fly lead 7, the detector 8 converting the electrostatic capacity into an electric signal and gives the reproduced signal to a head amplifier 22.

The pickup means 5 carries a magnet 4, and an electromagnet 6 for needle pressure control is disposed at the fixing portion in the vicinity of magnet 4. A coil is wound onto the electromagnet 6 and the magnet 4 is controlled in position corresponding to a current flowing in the coil so that the pickup needle 5a pressure for the video disc 1 is controlled. The output of the head amplifier 22 is guided to the output terminal 10 to be fed to the signal processing circuit (not shown). Here, the head amplifier 22 serves as a variable gain amplifier, whose gain is controlled by the voltage obtained by rectifying by a rectifier circuit 23 the signal to the output terminal 10, so that even when the input signal level from the signal detector 8 varies, the output signal to be obtained at the output terminal 10 becomes constant in amplitude. In other words, the head amplifier 22 and the rectifier circuit 23 constitute an automatic gain control means, wherein the output of rectifier circuit 23, in turn the gain control signal to be given to the head amplifier 22, has voltage corresponding to the amplitude of the signal reproduced by the video disc 1. Namely, when the input signal is larger, the gain control voltage becomes larger to lower the gain, and conversely, when the input signal is smaller, the gain control voltage becomes smaller to raise the gain. Finally, the output signal obtained from the output terminal 10 is controlled to keep the constant level.

Since the gain control voltage of AGC as abovementioned corresponds to the level of the signal reproduced from the video disc 1, the voltage is fed to a needle pressure control system 24 to control the electromagnet 6, thereby materializing proper needle pressure control. For example, when dust sticks between the video disc 1 and the pickup needle 5a, the output lowers and the gain control voltage becomes smaller, whereby pickup 5 is held by a spring 58 and the electromagnet 6 is driven in the opposite direction corresponding to the gain control voltage to increase pressure of pickup needle 5a to thereby remove the dust. As a result, a stable reproduced signal output is obtained, whereby this embodiment has the advantage in that no deterioration occurs in the S/N ratio in comparison with the use solely of automatic gain control.

FIG. 7 shows construction of an AGC and needle pressure control system, in which the signal output from the signal detector 8, which has a low level, is amplified by a preamplifier 25 and given to a variable gain amplifier 26, in which the gain is controlled by gain control voltage output from an exponential conversion circuit 30, thereby making constant the amplitude of the output signal. The output signal is given to the output terminal 10 through an output amplifier 27 and then fed to the signal processing system (not shown). The output signal in part from the output amplifier 27 is given to the rectifier circuit 23 and converted into DC voltage corresponding to the signal amplitude and then supplied to an error amplifier 29. The error amplifier 29 is given a reference voltage from a reference voltage source 28, thereby obtaining a voltage difference between the reference voltage and the DC component corresponding to the former output signal amplitude. In other words, DC voltage corresponding to an error with respect to the predetermined reference amplitude is obtained, the error voltage being given to an exponential converter circuit 30 to obtain the gain control voltage proportional to the exponent of the error signal.

Here, when the input signal to the variable gain amplifier 26 is represented by Vi, the output signal by Vo, the gain control voltage to variable gain amplifier 26 by Vc, and the gain by G, the following equations should hold:

$$Vo = GVi \quad (3)$$

$$Vc = k_1 e^{aVo} \quad (4),$$

where a: constant, and $k_1$: constant.

From the equation (3), $G = Vo/Vi$ is given and the output signal Vo is controlled to have the constant level by AGC. Therefore, $$G \propto 1/Vi \quad (5)$$

is given.

Assuming that the gain of variable gain amplifier 26 is controlled linearly by the gain control voltage Vc, the following equation is obtained:

$$G = k_2 Vc = k_1 k_2 e^{aVo} \quad (6),$$

where $k_2$: the constant.

Therefore, the following equation is given by the equations (5) and (6):

$$Vo \propto -\log Vi \quad (7)$$

In brief, the control voltage obtained from the exponential conversion circuit 30 becomes proportional to the logarithm of input signal Vi.

As abovementioned, it is effective for elimination of influence of the sticking dust between the video disc and the pickup needle point to increase the needle pressure in a manner of being proportional to the logarithm of magnitude of lowering input signal. Accordingly, this embodiment is so constructed that the gain control voltage Ve: the output of exponential conversion circuit 30, is set to the time constant through a low-pass filter 31 and then fed to the needle pressure coil driving amplifier 32, thereby controlling the pickup needle 5a pressure.

Such construction can obtain from the output terminal 10 a stable output signal of the constant level by AGC and under the needle pressure control to eliminate the influence of sticking dust, thereby improving the picture quality and sound quality reproduced by the video disc. Furthermore, the control signal (voltage) generating unit can employ the AGC and needle pressure control in common, whereby not only the circuit constitution is simple but also the number of pins for integration is effectively reducible.

Figure 8:
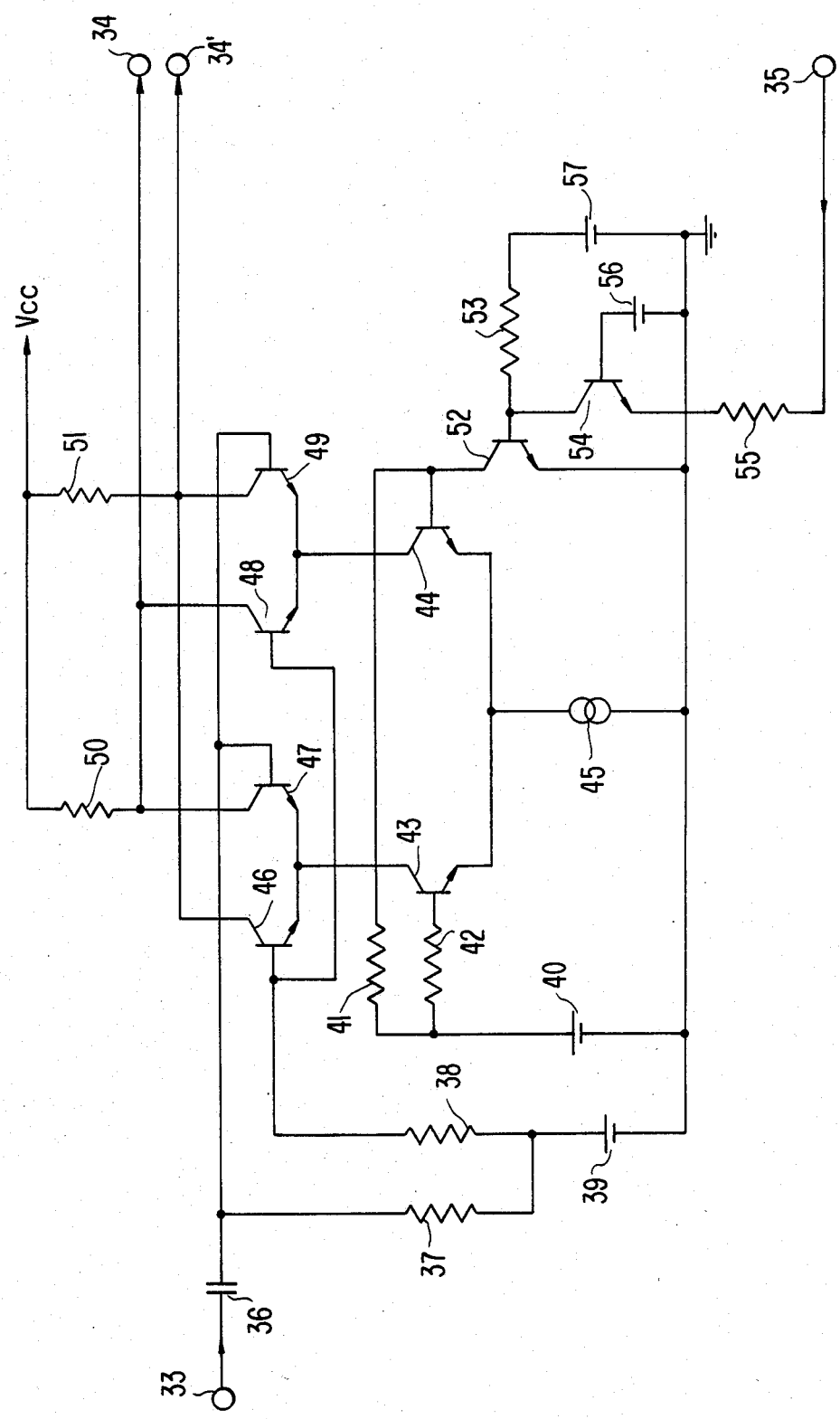
FIG. 8 is a circuit diagram concretely showing the principal portion of the FIG. 7 embodiment.

Next, the variable gain amplifier and the exponential conversion circuit used in this invention are shown of the exemplary circuit diagram in FIG. 8, in which an input terminal 33 is given a signal gained by the signal detector 8, which signal is applied on the bases of transistors 47 and 49 through a capabitor 36. The bases of transistors 46 and 48 are given a bias from a voltage source 39 through a resistor 38, the bases of transistors 47 and 49 similarly under a bias through a resistor 37. Resistors 50 and 51 are load resistors, through which the equilibrium outputs are obtained across the output terminals 34 and 34'. Transistors 43, 44, 46, 47, 48 and 49 constitute a usual double-balanced modulator circuit, in which a signal applied to the input terminal 33 is amplified by the gain proportional to a difference voltage between the bases of transistors 43 and 44, and outputted from the output terminals 34 and 34'. Reference numeral 45 designates a constant current source, and resistors 43 and 41 are bias resistors for feeding equal bias from a voltage source 40 to the bases of transistors 43 and 44 respectively. A transistor 52 is for exponential transformation, whose collector is connected to the base of transistor 44 and whose base is connected to a voltage source 57 through a resistor 53. A transistor 54 is connected at its collector to the base of transistor 52, the base of transistor 54 being given constant voltage from a voltage source 56, the emitter of the same being connected to a control terminal 35 through a resistor 55.

In the double-balanced modulator circuit, the transistors 43 and 44, when the transistor 52 is on, are equal to each other in the base voltage so that the gain is zero, but when a current flows in the transistor 52, the base bias to the transistors 43 and 44 is out of balance to increase the gain. In this case, the gain is proportional to the collector current of transistor 52, the collector current of transistor 54 being proportional to the voltage applied to the control terminal 35. Hence, the base voltage of transistor 52 is about inversely proportional to the voltage applied to the control terminal 35, and the collector current Ic of transistor 52 with respect to the base voltage (across the base and the emitter) thereof is given by the following equation:

$$Ic = Io\left(1 - \epsilon\frac{qV_{BE}}{kT}\right), \quad (8)$$

where
- Io: saturation current in the reverse direction,
- q: electric charge of electron,
- k: Boltzmann constant, and
- T: absolute temperature.

Accordingly, Ic is about proportional to the exponent of $V_{BE}$, whereby the gain of double-balanced modulator circuit changes in proportion to the exponent of the control voltage applied to the control terminal 35. Such a construction can realize the variable gain amplifier 26 and exponent conversion circuit 30 shown in FIG. 7.

As seen from the above, the embodiments of the invention performs the automatic gain control with respect to the reproduced signal amplitude during the reproduction by the video disc of the electrostatic capacity detection system; allows its gain control voltage to have an exponential function characteristic; and feeds the gain control voltage also to the needle pressure control system to enable the needle pressure control in proportion to the logarithm of the input amplitude variation, whereby the needle pressure can be kept effective regardless of the reproduction level of the video disc, and the sticking dust between the video disc and the pickup needle point can be effectively removed with scarecely affecting the reproduction. Therefore, the S/N ratio of the reproduced signal is free from deterioration so as to maintain reproduction of the video signal and aural signal in high quality. Furthermore, the circuitry is simple and the integration of circuit is easy as aforesaid. Hence, this invention has an extremely large industrial value.

What is claimed is:

1. A video disc reproducing apparatus comprising:
   a pickup means for detecting an information recorded on a recording disc as a variation in electrostatic capacity, said pickup means having a pickup needle;
   a pickup needle pressure control means which controls the needle pressure of said pickup needle;
   an automatic gain control means which generates a control signal used for maintaining an output signal of said apparatus so as to be constant,
   wherein said automatic gain control means comprises: a rectifier for rectifying said output signal of said apparatus; a reference voltage source for generating a reference signal; a differential amplifier for generating an error signal between an output signal of said rectifier and said reference signal; an exponential conversion means for converting said error signal to an exponential error signal; and a variable gain amplifier for controlling said output signal of said apparatus according to said exponential error signal, said error signal controlling the needle pressure of said pickup needle.

2. A video disc reproducing apparatus according to claim 1, wherein said variable gain amplifier is a double balanced modulator circuit, and said exponential conversion means is a transistor, the collector thereof being connected to a control input terminal of said double balanced modulator circuit and the collector current of said transistor varying according to the exponential of a voltage between the base and the emitter of said transistor and being said exponential error signal.

3. A video disc reproducing apparatus comprising:
   a pickup means for detecting an information recorded on a recording disc as a variation in electrostatic capacity, said pickup means having a pickup needle;
   a pickup needle pressure control means for controlling the needle pressure of said pickup needle;
   a control signal generator which generates a control signal for controlling said pickup needle pressure control means, said control signal being generated in proportion to a logarithm of the amplitude of a signal outputted from said pickup means;
   wherein said control signal generator comprises: a logarithm converter which generates a voltage signal in proportion to the logarithm of said signal outputted from said pickup needle; a rectifier for rectifying an output signal of said logarithm converter; and a lowpass filter for smoothing an output signal of said rectifier, an output signal of said lowpass filter being applied to said pickup needle pressure control means for controlling the needle pressure of said pickup needle;
   and wherein: said lowpass filter comprises a first lowpass filter and a second lowpass filter connected in parallel to each other, the time constant of one of said first and second lowpass filters being different from that of the other; and said apparatus further comprises a differential amplifier which generates a differential signal of output signals from said first and second lowpass filters, said differential signal being applied to said pickup needle pressure control means for controlling the needle pressure of said pickup needle.

* * * * *